(12) United States Patent
Adler et al.

(10) Patent No.: US 12,332,992 B2
(45) Date of Patent: Jun. 17, 2025

(54) CONTROLLING ELECTRIC VEHICLE CHARGING SECURITY SYSTEM

(71) Applicant: GM GLOBAL TECHNOLOGY OPERATIONS LLC, Detroit, MI (US)

(72) Inventors: Aaron Adler, Rochester Hills, MI (US); Malek Jaradi, Troy, MI (US); Matthew Neely, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 18/096,041

(22) Filed: Jan. 12, 2023

(65) Prior Publication Data

US 2024/0241940 A1    Jul. 18, 2024

(51) Int. Cl.
| | |
|---|---|
| *B60L 53/60* | (2019.01) |
| *B60L 53/66* | (2019.01) |
| *G06F 21/44* | (2013.01) |
| *G06K 7/10* | (2006.01) |

(52) U.S. Cl.
CPC ............ *G06F 21/445* (2013.01); *B60L 53/66* (2019.02); *G06K 7/10297* (2013.01)

(58) Field of Classification Search
None
See application file for complete search history.

(56) References Cited

U.S. PATENT DOCUMENTS

| | | | |
|---|---|---|---|
| 2023/0192063 A1* | 6/2023 | Cronin | B60L 50/40 |
| | | | 701/22 |
| 2023/0382245 A1* | 11/2023 | Seong | B60L 53/12 |
| 2023/0398895 A1* | 12/2023 | Lu | B60L 53/305 |
| 2024/0010095 A1* | 1/2024 | Shin | G06Q 50/06 |
| 2024/0083453 A1* | 3/2024 | Caveney | B60L 53/66 |
| 2024/0089245 A1* | 3/2024 | Allamsetty | B60L 53/65 |

FOREIGN PATENT DOCUMENTS

DE    102018132979 A1 *  6/2020

* cited by examiner

*Primary Examiner* — Christopher B Robinson
(74) *Attorney, Agent, or Firm* — Quinn IP Law

(57) ABSTRACT

A method and system for controlling charging security systems to enable sharing of charging stations, such as by allowing vehicle owners to use their cell phone or other device to request disarming or otherwise disabling a charging security system so that a corresponding charging station can be shared with another vehicle.

16 Claims, 2 Drawing Sheets

CONTROLLING ELECTRIC VEHICLE CHARGING SECURITY SYSTEM

INTRODUCTION

The present disclosure relates to controlling vehicle security systems, such as but not necessarily limited to controlling a charging security system included onboard a vehicle and/or a charging station to secure a charging event occurring between the vehicle and the charging station.

Charging stations may be configured to provide electrical power for purposes of charging a battery used to electrically power a drivetrain of an electric vehicle. Some charging stations may be provided in public areas, at service stations, and elsewhere to assist electric vehicle owners in charging their vehicles while traveling. When using the charging stations, some vehicle owners may engage an alarm, a lock, or other security measure onboard the vehicle and/or the charging station, with the intent of the security measure being aimed at thwarting or otherwise discouraging another individual from disconnecting the owner's vehicle from a charging station, i.e., to prevent another vehicle owner from disconnecting the charging station for purposes of charging their own vehicle. Such limitations on sharing the charging station may be undesirable when the connected vehicle has completed its charging event, i.e., its battery has been fully or sufficiently charged, and is no longer in need of the charging station and/or in the event another situation arises whereby it may be desirable to allow another vehicle to use the charging station, such as to enable sharing of a charging station when the owner of a connected vehicle is away from the charging station or is unidentifiable to the individual desiring use of the charging station.

SUMMARY

One non-limiting aspect of the present disclosure contemplates controlling charging security systems to enable sharing of charging stations, such as by allowing vehicle owners to use their cell phone or other mobile device to request disarming or otherwise disabling a charging security system so that a corresponding charging station may be shared with another vehicle.

One non-limiting aspect of the present disclosure relates to a system for controlling a charging security system included onboard a vehicle where the charging security system may be configured to secure a charging event occurring between the vehicle and a charging station. The system may include a credential controller offboard the vehicle configured to provide a security message to a requesting device in response to receiving a security request therefrom. The security message may include a security credential generated by the credential controller for the requesting device. The system may further include a security controller onboard the vehicle configured to: receive a command request from the requesting device, the command request including the security credential; relay the command request to the credential controller for processing of the security credential; receive a command message from the credential controller in response to the command request; control the charging security system to remain in a first state in response to the command message indicating the command request as unapproved; and control the charging security system from the first state to a second state in response to the command message indicating the command request as approved.

The charging security system may include an alarm. The first state may arm the alarm to generate an alert in response to the charging station being electrically disconnected from the vehicle, and the second state may disarm the alarm to prevent the alert from being generated in response to the charging station being electrically disconnected from the vehicle.

The charging security system may include a lock configured to mechanically lock a charging cord to a charge port on the vehicle. The charging cord may be configured to exchange electrical power between the vehicle and the charging station. The first state may mechanically lock the lock to thwart disconnecting the charging cord from the charging port, and the second state may mechanically unlock the lock to permit disconnecting the charging cord from the charging port.

The system may include a near field communication reader onboard the vehicle configured to receive the command request from the requesting device. The near field communication reader may be configured to perform an inductive coupling with the requesting device to receive the command request. The inductively coupling may require the requesting device to be in a near field proximity to the near field communication reader.

The security controller may be configured to transmit a notification message through the near field communication reader to the requesting device in response to receipt of the command message. The notification message may indicate whether the command request was approved or unapproved.

The credential controller may be configured to implement a verification process in response to the command request. The verification process may determine the command request as one of approved and unapproved. To determine the command request as approved, the verification process may require the security credential included with the command request to properly match with the security credential included with the security message. To determine the command request as approved, the verification process may require an operator of the vehicle to approve the command request. To determine the command request as approved, the verification process may require a battery charge level of the vehicle to be greater than a charge threshold.

The credential controller is configured to determine: a current location of the vehicle; a battery level needed for the vehicle to travel from the current location to a home location; and the charge threshold to meet the battery level.

The credential controller is configured to generate the security credential as a random identifier and to associate the random identifier with a unique identifier assigned to the requesting device. The command request may include the random identifier and the unique identifier. The verification process may be configured to determine the command request as approved in response to the random identifier and the unique identifier included therewith properly matching with the random identifier and the unique identifier associated with the security message. The verification process may be configured to determine the security credential as unapproved in response to the random identifier and the unique identifier included therewith improperly matching with the random identifier and the unique identifier associated with the security message.

The requesting device may be a mobile device configured to wireless exchange the security request and the security message with the credential controller separately and independently of the charging station and the vehicle, optionally with the charging station being offboard the vehicle.

One non-limiting aspect of the present disclosure relates to a system for controlling a charging security system where the charging security system may be configured to secure a charging event occurring between a charging station and a vehicle. The system may include a credential controller configured to provide a security message to a mobile device operating offboard the vehicle in response to receiving a security request therefrom, the security message including a security credential generated by the credential controller uniquely for the mobile device. The system may further include a security controller configured to: receive a command request from the mobile device when positioned within a near field proximity to a near field communication reader onboard the vehicle, the command request requesting the security controller to transition the charging security system from an armed state to a disarmed state, the command request may include the security credential; relay the command request to the credential controller for processing of the security credential; receive a command message from the credential controller in response to credential controller performing a verification process to determine the command request to be one of approved and unapproved; control the charging security system to remain in the armed state in response to the command message indicating the command request to be unapproved; and control the charging security system from the armed state to the disarmed state in response to the command message indicating the command request to be approved.

The credential controller may be configured to generate the security credential as a random identifier and to associate the random identifier with a unique identifier assigned to the requesting device. The command request may include the random identifier and the unique identifier.

The verification process may be configured to determine the command request as approved in response to the random identifier and the unique identifier included therewith properly matching with the random identifier and the unique identifier associated with the security message.

The armed state may correspond with the charging security system generating an alert in response to the vehicle being disconnected from the charging station or locking a lock configured to thwart disconnecting a charging cord of the charging station from the vehicle.

The disarmed state may correspond with preventing the alert from being generated in response to the vehicle being electrically disconnected from the charging station or unlocking the lock to permit disconnecting the charging cord from the vehicle.

One non-limiting aspect of the present disclosure relates to a system for controlling a charging security system where the charging security system may be configured to secure a charging event between a charging station and a vehicle. The system may include a credential controller configured to provide a security message to a mobile device operating offboard the vehicle in response to receiving a security request therefrom, the security message including a security credential generated by the credential controller uniquely for the mobile device. The system may further include a security controller configured to: exchange a command request with the mobile device via a near field communication reader onboard the vehicle, the command request requesting the security controller to transition the charging security system from an armed state to a disarmed state, optionally with the command request including the security credential; exchange a command message with the credential controller in response to the credential controller performing a verification process on the security credential included within the command request, optionally with the verification process determining the command request to be one of approved and unapproved; control the charging security system to remain in the armed state in response to the command message indicating the command request to be unapproved; and control the charging security system from the armed state to the disarmed state in response to the command message indicating the command request to be approved.

The credential controller may be offboard the vehicle and the security controller may be onboard the vehicle.

The credential controller may be offboard the vehicle and the security controller may be offboard the vehicle.

The charging security system may be onboard the charging station.

The charging security system may be onboard the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
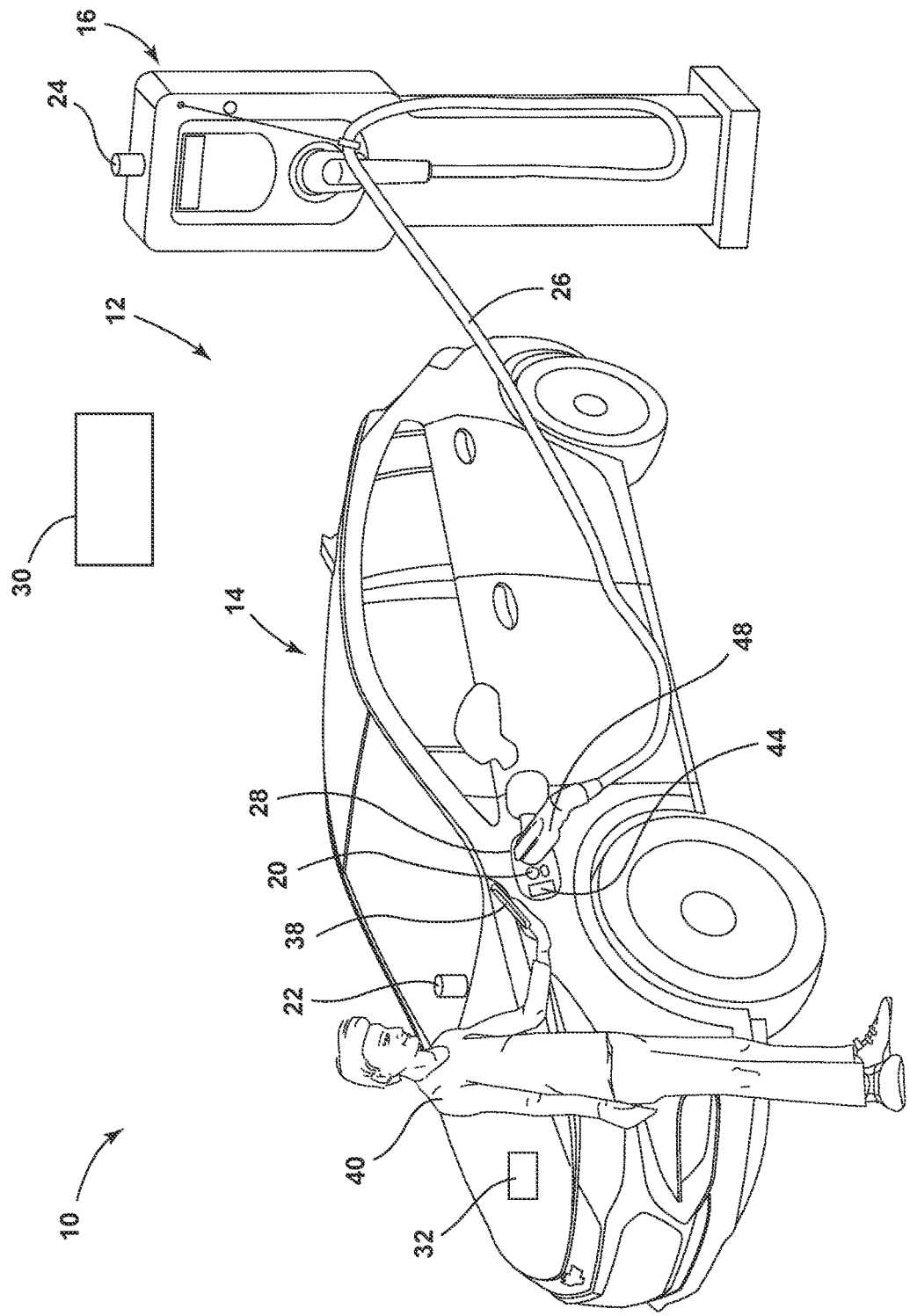
FIG. 1 illustrates a system for controlling a charging security system in accordance with one aspect of the present disclosure.

FIG. 1 illustrates a system 10 for controlling a charging security system 12 operable with a vehicle 14 and a charging station 16 in accordance with one aspect of the present disclosure. The charging security system 12 may include a lock 20 and/or an alarm 22 onboard the vehicle 14, an alarm 24 onboard the charging station 16, and/or other security mechanisms aimed at thwarting or otherwise discouraging an individual from disconnecting the vehicle 14 from the charging station 16. The present disclosure contemplates the charging security system 12 including a wide variety of measures and capabilities for securing a charging event ongoing between the vehicle 14 and the charging station 16, and as such, the exemplary illustration is provided for non-limiting purposes. The charging event may include the use of a charging cord 26 to electrically connect a charging port 28 on the vehicle 14 with the charging station 16.

The charging station 16 may be configured to provide electrical power through the charging cord 26, which the vehicle 14, optionally with the assistance of an onboard battery charge module (OBCM) (not shown), may be configured to use for electrically charging a battery (not shown) configured to electrically power a drivetrain or feature (not shown) included onboard the vehicle 14. The charging event is shown to rely on the charging cord 26 to transfer electrical power for non-limiting purpose as the present disclosure fully contemplates other, non-wired methods for exchange electrical power, such as through inductive or wireless processes. The charging event is predominately described with respect to the charging station 16 providing electrical power to the vehicle 14 for exemplary purposes as the present disclosure fully contemplates the charging event occurring with the vehicle 14 providing electrical power to the charging station 16. The charging station is illustrated for non-limiting purposes as being a standalone entity, however, the present disclosure fully contemplates the charging station 16 having other configurations, including the charging station 16 being onboard another vehicle, such as to provide vehicle-to-vehicle charging and discharging.

The system 10 may include a credential controller 30 and a security controller 32 configured to enable sharing of the charging station 16, or multiple charging stations 16, such as by allowing individuals to use a device 38, such as their cell phone or other mobile device and/or a physically unconnected item, such as a wristband or card, to request controlling the charging security system 12 for purposes of sharing the charging station 16 with another vehicle (not shown). In response to corresponding control of the charging security system 12, an individual 40 requesting use of this charging station 16 may be permitted, instructed, or otherwise allowed to disconnect the charging cord 26 from the vehicle 14, which the individual 40 may then connect to their own vehicle 14, e.g., the charging cord 26 may have a length sufficient to enable connecting it to a vehicle 14 parked nearby. The present disclosure is predominantly described with respect to controlling the charging security system 12 so as to enable the charging station 16 to be disconnected from one vehicle 14 and connected to another vehicle. This is done for non-limiting purposes as the present disclosure fully contemplates the desirability of disconnecting the charging station 16 from the vehicle 14 for purposes of connecting the charging station 16 to another device, such as to facilitate charging a portable battery or a rechargeable energy storage system (RESS) without having to connect the charging cord 26 to another vehicle.

The system 10 may be configured to permit controlling the charging security system 12 without requiring the vehicle 14 and/or the charging station 16 to have prior knowledge, authorizations, or other awareness of the individual 40 and/or the individual's mobile device 38. The ability to permit disarming of the charging security system 12 in this manner may be beneficial in enabling a wide variety of individuals 40 and entities to request sharing of the charging station 16. The mobile phone 38, for example, may be configured to request access to the charging station 16 or to otherwise instigate a request for controlling the charging security system 12 through the use of a charging application. The charging application may be downloadable to the mobile device 38 through an application store, etc. and configured as described herein to facilitate controlling the charging security system 12. The charging application, for example, may be configured to facilitate exchanging messages, packets, signals, etc. between the security controller 32, the credential controller 30, and/or other elements included onboard the vehicle 14 and/or the charging station 16. The illustrated embodiment shows the security controller 32 onboard the vehicle 14 and the credential controller 30 offboard the vehicle 14 for non-limiting purposes in order to demonstrate one aspect of the present disclosure whereby the mobile phone may be required to communicate independently with the vehicle 14 and the credential controller 30 in order to control the charging security.

The security controller 32 is shown to be onboard the vehicle 14, and the credential controller 30 is shown to be offboard the vehicle 14, such as at a back office or other server capable of communicating with both of the vehicle 14 and the mobile device 38, and optionally the charging station 16. The present disclosure fully contemplates the security controller 32 being offboard the vehicle 14 and/or the credential controller 30 being onboard the vehicle 14, and optionally either or both being onboard the charging stations 16. The present disclosure predominantly describes multiple exchanges between the mobile phone 38 and the credential controller 30, the mobile phone 38 and the security controller 32, and/or the security controller 32 and the credential controller 30 when controlling the charging security system 12 for non-limiting purposes in order to demonstrate advantageous capabilities of the present disclosure to confirm proximity of the mobile device 38 to the vehicle 14 using communication between the mobile device 38 and the vehicle 14 and to leverage system processing and other capabilities of the credential controller 30 to manage the charging application and generate security credentials.

The system 10 may include a near field communication reader or interface 44 onboard the vehicle 14 to facilitate exchanging signals with the mobile device 38. The near field communication reader 44 may be configured to be inductively coupled with the mobile device 38 when the mobile device 38 is positioned within a near field proximity to the vehicle 14. The inductive coupling may correspond with the near field communication reader 44 and a corresponding feature on the mobile device 38 being configured to wirelessly exchange information with each other without having to undertake an authentication or other exchange, e.g., without requiring the mobile device 38 and the near field communication reader 44 to exchange credentials. One non-limiting aspect of the present disclosure contemplates the charging application operating on the mobile device 38 being configured to exchange messages, signals, etc. with the security controller 32 via the near field communication reader 44. This capability may be beneficial enabling the mobile device 38 to communicate with the security controller 32 without requiring the security controller 32 to have prior knowledge or awareness of the mobile device 38, which may also be helpful in maximizing sharing of the charging station 16.

As noted above, the charging security system 12 may include the lock 20 and/or the alarm 22 onboard the vehicle 14, the alarm 24 onboard the charging station 16, and/or other security mechanisms aimed at thwarting or otherwise discouraging an individual 40 from disconnecting the vehicle 14 from the charging station 16. The lock 20 may be a mechanical lock configured to be controlled between a lock state and an unlocked state, optionally with a manual override using a key. The lock state may correspond with a latch, a restraint, or other mechanism (not shown) mechanically and physically engaging with a corresponding feature (not shown) on a charge connector or other interface 48 included as part of the charging cord 26 to electrically connect the vehicle 14 with the charging station 16. When in the locked state, the lock 20 may mechanically thwart disconnecting the charging cord 26 from the charging port 28, whereas, in the unlocked state, the lock 20 may be configured to permit disconnecting the charging cord 26 from the charging port 28. When armed, the alarm 22 may be configured to generate an alert, such as an audible and/visual alert, in response to the charging station 16 being electrically disconnected from the vehicle 14, and when disarmed, the alarm 22 may be configured to prevent the alert from being generated in response to the charging station 16 being electrically disconnected from the vehicle 14.

The security controller 32 may be configured to issue commands or otherwise control the lock 20 and the alarm 22 onboard the vehicle 14 facilitate the operations contemplated herein. The present disclosure predominantly described with respect to the control of the charging security system 12 relating to the security features included onboard the vehicle 14, i.e., the lock and/or the alarm 20, 22. This is done for nonlimiting purposes in order to demonstrate advantageous capabilities of the present disclosure to facilitate disabling or otherwise control and security measures included onboard the vehicle 14 to permit sparing of the charging stations 16. To the extent additional security measures may be included onboard the charging stations 16, e.g., the alarm 24, additional processes may be undertaken to facilitate controlling those security measures to permit disconnecting of the charging cord 26 and/or otherwise sharing the charging station 16. Limiting control of the charging security system 12 to actions instigated at or through the vehicle 14 may be beneficial in ensuring the vehicle 14 remains connected until sufficient security protections are overcome, i.e., to protect against undesirable disconnects or sharing of the charging station 16 that may leave the connected vehicle 14 insufficiently charged.

Figure 2:
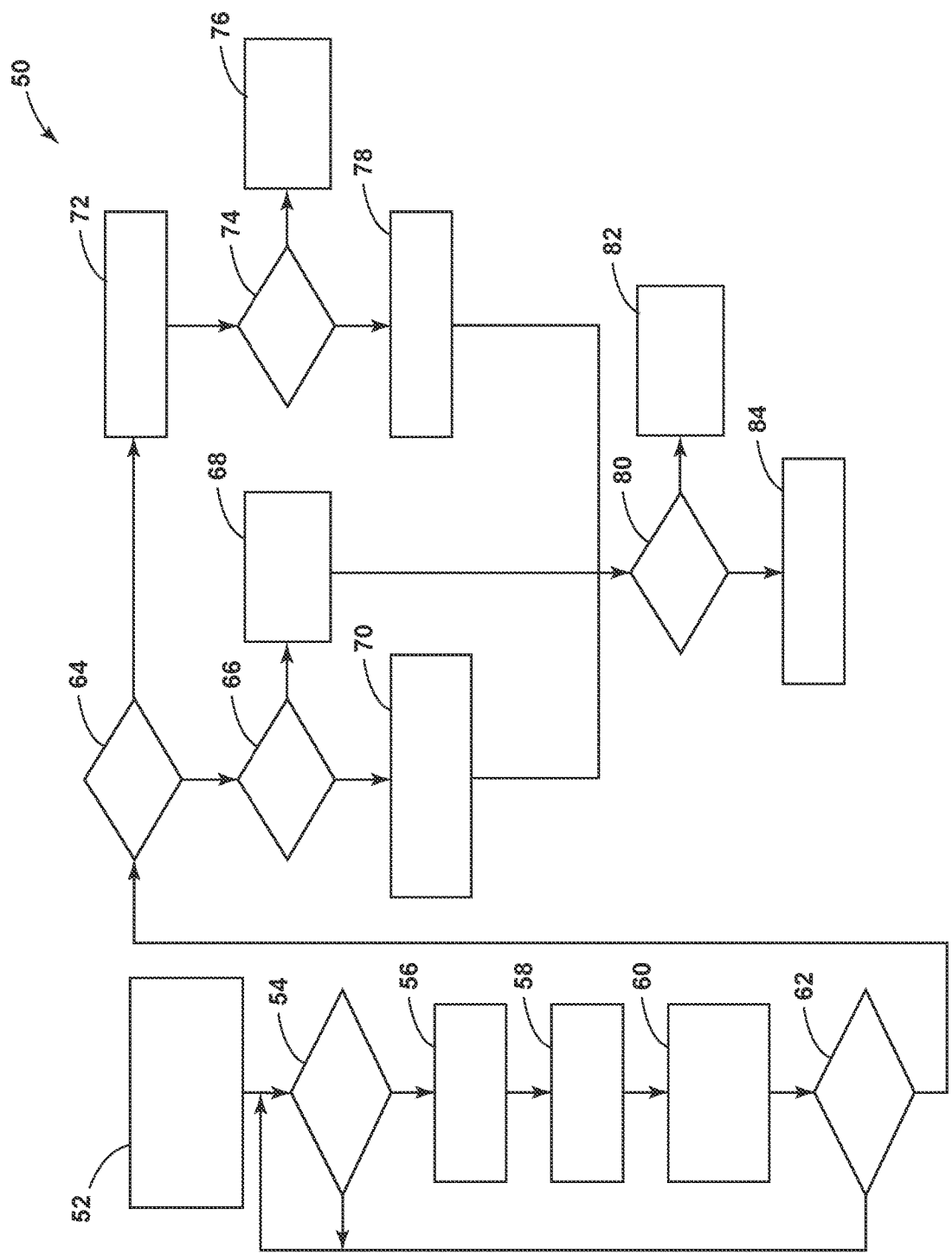
FIG. 2 illustrates a flowchart of a method for controlling a charging security system in accordance with one non-limiting aspect of the present disclosure.

FIG. 2 illustrates a flowchart 50 of a method for controlling a charging security system 12 in accordance with one non-limiting aspect of the present disclosure. The method may be embodied in and/or facilitated with execution of a plurality of non-transitory instructions stored on computer readable storage mediums associated with the described above features, which when executed with a corresponding processor, may be sufficient to facilitate the operations, processes, functions, etc. described herein. Block 52 relates to a login process or a registration process whereby an individual 40 requesting to share the charging station 16 connected to the vehicle 14 may be required to log into or otherwise access the charging application included on the mobile device 38. This may optionally include the mobile device 38 completing a registration process with the credential controller 30 before the charging application may be downloaded to the mobile device 38 and/or before the charging application may be authenticated for use on a mobile device 38.

Block 54 relates to a security request process whereby the mobile device 38 may be configured to transmit a security request to the credential controller 30. The security request process may be part of a multi-part authentication and security process for protecting against unapproved sharing of the charging station 16. The security request may be transmitted from the charging application on the mobile device 38 for communication to the credential controller 30. The communication of the security request may optionally occur independently of or without reliance on the vehicle 14, such as through communications executed over a wireless or cellular network. The security request may include a time stamp, location information, a unique identifier (e.g., mobile ID) assigned to the mobile device 38 (e.g., a media access control (MAC) address, a universal resource identifier (URI), etc.), and/or other information, such as identity of the requesting individual 40, contact information for transmitting alerts to the mobile phone 38 (e.g., email address or mobile phone number), etc.

Block 56 relates to a security message process whereby the credential controller 30 or the security controller 32 may generate a security credential for the mobile device 38 in response to receipt of the security request. The security credential may be a random number or other security measure uniquely generated for the mobile device 38 at the time of receiving the security request. The security credential may optionally be associated with the unique identifier assigned to or otherwise associated with the mobile device 38 or the charging application so as to permit the credential controller 30 to store a relationship between the random number and the unique identifier of the mobile device 38 in receipt thereof, which may provide a mobile device ID for the mobile device 38. The security credential may be communicated from the credential controller 30 to the mobile device 38 within a security message, or from the security controller 32 to the credential controller 30 when generated at the mobile device 38. The security message may be communicated to the mobile device 38 independently of the vehicle 14, such as with communications similar to that employed to facilitate communicating the security request from the mobile device 38 to the credential controller 30. The security message may include information or instructions for the individual 40 to position the mobile device 38 within a near field proximity to the near field communication reader 44 or to take other action associated with facilitating control of the charging security system 12.

Block 58 relates to a command request process whereby the mobile device 38 may issue a command request to request disarming, unlocking, or otherwise transitioning the charging security system 12 from a first state to a second state, i.e., transitioning the charging security system 12 so as to disable existing security measures and permit the charging cord 26 to be disconnected from the vehicle 14 without activating the charging security system 12. The command request may be issued from the charging application on the mobile device 38 to the security controller 32 onboard the vehicle 14 via signaling exchanged through the near field communication reader 44. The use of the near field communication reader may be beneficial in ensuring the mobile device 38 is close to the vehicle 14 due to the inductive coupling requiring the mobile device 38 to be in a near field proximity to the near field communication reader 44. The capability to assure proximity of the mobile device 38 to the vehicle 14 may be beneficial enhancing security, however, the present disclosure fully contemplates other communication mechanisms, including the mobile device 38 issuing the command request directly to the security controller 32, the charging station 16, and/or the credential controller 30.

Block 60 relates to a relay or other communication process whereby the security controller 32 may be configured to establish communications with the credential controller 30 for purposes of verifying the command request. The communication process, for example, may include the security controller 32 relaying the command request to the credential controller 30 or transmitting another message to the credential controller 30. The charging application may be configured to include the security credential received in the security message within the command request and optionally the unique identifier associated with the mobile device 38. The charging application may also be configured to include a vehicle identification number (VIN) of the vehicle 14 associated with the requesting mobile device 38 or individual 40 associated therewith and/or additional information to be used in deciding whether the command request should be approved or unapproved, e.g., the individual 40 may be required to provide a reason or justification for sharing the charging station 16, such as by providing a state of charge for the vehicle intended to be charged or other measurable for assessing charging needs of the requesting individual 40 or mobile device 38.

Block 62 relates to the credential controller 30 instigating a verification process in response to receipt of the command request. The verification process may include the credential controller 30 performing a variety of inquiries to determine whether the command request should be granted. The present disclosure contemplates a number of inquiries and measurable being consulted to determine situations where it may be appropriate for disconnecting the vehicle 14 to share the charging stations 16, as well as situations where it may be inappropriate or otherwise undesirable to permit disconnecting the vehicle 14 for purposes of sharing the charging station 16. The verification process may require the security credential issued to the mobile device 38 in the security message (e.g., Block 56) to properly match with the security credential included within the command request (e.g., Block 60). This may include the credential controller 30 making an assessment as to whether the random number included within the security request and associated with the unique identifier of the mobile device 38 has also been received at the security controller 32 via the command request. The verification process may include the credential controller 30 determining the command request as one of approved and unapproved. To determine the command request as approved, the verification process may also require an operator of the vehicle 14 to approve the command request and/or a battery charge level of the vehicle 14 to be greater than a charge threshold, such as a threshold needed for the vehicle 14 to travel from a current location to a home location.

Block 54 may be returned to in the event the verification process determines the command request to be unapproved. The credential controller 30 may optionally issue a command message to the security controller 32 to apprise the security controller 32 as to whether the request has been approved or unapproved. In the case of the command request being unapproved, the credential controller 30 may optionally withhold transmission of the command request, which after a predefined period of time may prompt the charging application to provide a corresponding denial through the mobile device 38. Block 64 relates to the verification process including a default settings process for determining whether an owner of the vehicle 14 has set default charge settings for the vehicle 14. The default settings process may be reached in the event the verification process determines the command request to be approved. The default settings process may relate to determining whether the owner of the vehicle 14 as set one or more conditions to be met before permitting unlocking or disarming of the charging security system 12.

Block 66 relates to a location features process being included as part of the verification process for determining whether location based features have been disabled for the vehicle 14. The location features process may be reached in the event the vehicle 14 owner has set the default settings. Block 68 relates to a location process for unlocking or disarming the charging port of the vehicle 14, i.e., transitioning the charging security system 12 from the first state to the second state, based on a current location of the vehicle 14, e.g., permitting unlocking or disarming of the charging security system 12 if the vehicle 14 is currently away from its home or away from a home charging station 16, and otherwise preventing unlocking or disarming if not. Block 70 relates to a default process included as part of the verification process for unlocking or disarming the charging security system 12 depending on whether the default settings requested by the owner of the vehicle 14 have been met, e.g., unlocking or disarming the charging port after a certain battery charge has been reached, etc.

Block 72 relates to a push notification process being included as part of the verification process for purposes of issuing a push notification to the owner of the vehicle 14. The push notification may optionally be issued in the event the owner has not set default settings for charging station sharing. The push notification may be transmitted to the vehicle 14 or to a mobile device of the owner of the connected vehicle 14. It may be more likely that the owner is away from the vehicle 14, and as such, it may be a default to transmit the push notification to the owner's mobile device. Block 74 relates to a push notification process whereby the owner of the vehicle 14 may review the push notification to determine whether the corresponding command request should be approved or unapproved. Block 76 relates to a denial process whereby the vehicle 14 owner may interact with the push notification, such as through a corresponding application included on the mobile device 38, to deny disarming or unlocking of the charging security system 12. The denial process may include transmitting a corresponding denial message to the mobile device 38 requesting sharing of the charging station 16, which may be issued from the credential controller 30.

Block 78 relates to an approval process whereby the credential controller 30 may transmit the command message to the security controller 32 onboard the vehicle 14 to indicate authorization for arming disarming or unlocking the charging security system 12 in response to the vehicle 14 owner approving the push notification. Block 80 relates to a disarming assessment process for determining whether the control of the charging security system 12 has been successfully adjusted to permit disconnecting the charger cord 26 from the charging port 28, i.e., that the charging security system 12 has been transitioned from the first state to the second state, which the security controller 32 may determine based on feedback from the lock 20 for the alarms 22, 24 and/or in response to messages transmitted from the charging station 16, e.g., the charging station 16 may be configured to generate a disconnect message in response to being instructed by the credential controller 30 and/or the security controller 32 to permit sharing of the charging cord 26.

Block 82 relates to a notification process for apprising the requesting individual 40 of the disarming process being unsuccessful, e.g., that the unlocking or disarming of the charging security system may not be possible. Block 84 relates to a verification process for notifying both vehicle owners, i.e., the owner of the connected vehicle 14 and the individual 40 requesting to disconnect it, of the charging security system 12 having been successfully transitioned to permit disconnecting of the vehicle 14 and sharing of the charging station 16. A corresponding notification or multiple notification messages may be transmitted from the credential controller 30 and/or the security controller 32 through the wireless network and/or the near field communication reader 44. The owner sharing the vehicle 14 may optionally be awarded credits or other accomplishments for permitting sharing of the charging station 16 and of decremented credits or accomplishments for failing to share the charging station 16.

As supported above, the present disclosure may be configured to allow users to use their cell phone to request via an NFC interface access to another vehicle's EV charge plug when it is connected to another vehicle. The present disclosure may use the NFC reader on the outside of another vehicle to accomplish requesting access to another vehicles charge port through vehicle interfaces and the back office in a secure manner, such as with a mobile device, which may optionally require mobile devices to be logged into a myBrand application to request unlocking/disarming another vehicle's charge port. The present disclosure may automatically set the allowance of other vehicle owner's to access the charge port based on the owner's vehicle known location, e.g., if a vehicle is detected in home garage, it may be a default to keep the charge port armed and locked, and if the vehicle is detected outside the home garage, it may be a default to keep charge port armed and locked unless access is requested by another user, and if requested, the owner can authorize or reject request or setup permissions automatically or via push notifications to their mobile device.

The present disclosure may enable sharing of chargers in public spaces and/or enabling unique features such as sharing accomplishments/rewards for users sharing chargers with other vehicles creating a more collaborative and interactive user experience. This can also be integrated into a profile or driver score rating system. The present disclosure may enable push notifications to be presented to the vehicle owner, allowing them to grant access to unlocking/disarming their charge port. Granting access may be provided through a notification pop up or guide application where the owner may activate disarming the charge port via a remote command or accepting/denying on screen prompts. One such process may include: a requestor has cellular connection and is logged into myBrand app on their mobile device and a vehicle being requested to share the charging station having established a back office connection; the requestor selecting on their mobile device "Charger Request" to validate user intent to request the other vehicle unlock/disarm its charge port; the myBrand app creating a random "Mobile Device ID" and stores that ID in the back office; the requestor holding their mobile device to the exterior NFC interface on the requested vehicle; the requested vehicle reading the requestors mobile device via the NFC interface and reading the "Mobile Device ID" and "Command Request", which may be linked to their myBrand account profile and vehicle VIN, and sending the "mobile Device ID and Command Request" to the back office; the requested vehicle sending the "Mobile Device ID" and "Command Request" to the back office to verify the Mobile Device ID is valid, and if valid then a confirmation message may be sent back to the vehicle to continue; the requested vehicle checking if there are default settings enabled to immediately respond to the requestor, the requested vehicle checking if "Location Based Features are Disabled", and if disabled then initiating default settings, and if Location Based Features are enabled, then setting based on the vehicles location such as Home/Work etc., may be used to determine the action for unlocking/disarming the charge port; if default settings are enabled, then default settings may be used, such as the following: unlock/disarm charge port, unlock/disarm charge port after x % battery charged, lock/arm charge port only at geofenced home location, battery capacity being greater than charge needed to get to home destination, unlock/disarm charge port, and/or lock/arm charge port always; responding to default settings being sent to requestor and requested vehicle owners; if the charge port is successfully unlocked, communicating success message containing the Mobile ID to the back office through the NFC interface and/or TCP from the requested vehicle; back office associating Mobile ID and success message with myBrand app profile and vehicle VIN to update share rating score; if Default settings are not enabled on the requested vehicle, and if the vehicle is connected to back office and requested owners mobile device is logged into myBrand app, the Mobile Device ID and command request may be sent to the back office via the vehicle's cellular connection, whereby the requested owner may log into their myBrand app and the vehicle may be connected to the back office, otherwise notification to requestor via myBrand app will notify them the vehicle and/or user is offline; and/or a push notification may be sent to the requested vehicle owner's mobile device via app notification, text message and or email asking them to approve/dismiss sharing the charge port, and if the requested vehicle owner dismisses, a denial message may be sent to the requester either through the myBrand app or text message or email and if approved, a message from the back office may be sent to the requested vehicle to unlock/disarm the charge port and a related success message may be sent to the requester.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for controlling a charging security system included onboard a vehicle, the charging security system configured to secure a charging event occurring between the vehicle and a charging station, comprising:
a credential controller offboard the vehicle configured to provide a security message to a requesting device in response to receiving a security request therefrom, the security message including a security credential generated by the credential controller for the requesting device; and
a security controller onboard the vehicle configured to:
receive a command request from the requesting device, the command request including the security credential;
relay the command request to the credential controller for processing of the security credential;
receive a command message from the credential controller in response to the command request;
control the charging security system to remain in a first state in response to the command message indicating the command request as unapproved; and
control the charging security system from the first state to a second state in response to the command message indicating the command request as approved;
wherein the charging security system includes an alarm, the first state arming the alarm to generate an alert in response to the charging station being electrically disconnected from the vehicle, the second state disarming the alarm to prevent the alert from being generated in response to the charging station being electrically disconnected from the vehicle.

2. The system according to claim 1, wherein:
the charging security system includes a lock configured to mechanically lock a charging cord to a charge port on the vehicle, the charging cord configured to exchange electrical power between the vehicle and the charging station, the first state mechanically locking the lock to thwart disconnecting the charging cord from the charging port, the second state mechanically unlocking the lock to permit disconnecting the charging cord from the charging port.

3. The system according to claim 1, further comprising:
a near field communication reader onboard the vehicle configured to receive the command request from the requesting device.

4. The system according to claim 3, wherein:
the near field communication reader is configured to perform an inductive coupling with the requesting device to receive the command request, the inductively coupling requiring the requesting device to be in a near field proximity to the near field communication reader.

5. The system according to claim 3, wherein:
the security controller is configured to transmit a notification message through the near field communication reader to the requesting device in response to receipt of the command message, the notification message indicating whether the command request was approved or unapproved.

6. The system according to claim 1, wherein:
the credential controller is configured to implement a verification process in response to the command request, the verification process determining the command request as one of approved and unapproved.

7. The system according to claim 6, wherein:
to determine the command request as approved, the verification process requires the security credential included with the command request to properly match with the security credential included with the security message.

8. The system according to claim 6, wherein:
to determine the command request as approved, the verification process requires an operator of the vehicle to approve the command request.

9. The system according to claim 6, wherein:
to determine the command request as approved, the verification process requires a battery charge level of the vehicle to be greater than a charge threshold.

10. The system according to claim 9, wherein the credential controller is configured to determine:
a current location of the vehicle;
a battery level needed for the vehicle to travel from the current location to a home location; and
the charge threshold to meet the battery level.

11. The system according to claim 6, wherein:
the credential controller is configured to generate the security credential as a random identifier and to associate the random identifier with a unique identifier assigned to the requesting device;
the command request includes the random identifier and the unique identifier;
the verification process is configured to determine the command request as approved in response to the random identifier and the unique identifier included therewith properly matching with the random identifier and the unique identifier associated with the security message; and
the verification process is configured to determine the security credential as unapproved in response to the random identifier and the unique identifier included therewith improperly matching with the random identifier and the unique identifier associated with the security message.

12. The system according to claim 1, wherein:
the requesting device is a mobile device configured to wireless exchange the security request and the security message with the credential controller separately and independently of the charging station and the vehicle, the charging station being offboard the vehicle.

13. A method for controlling a charging security system, the charging security system configured to secure a charging event occurring between a charging station and a vehicle, comprising:
providing a security message to a mobile device operating offboard the vehicle, the security message issued from a credential controller in response to receiving a security request therefrom, the security message including a security credential generated by the credential controller uniquely for the mobile device, the credential controller generating th security credential as a random identifier and to associate random identifier with a unique identifier assigned to the mobile device;
receiving a command request at a security controller, the command request issued from the mobile device while the mobile device is positioned within a near field proximity to a near field communication reader onboard the vehicle, the command request requesting the security controller to transition the charging security system from an armed state to a disarmed state, the command request including the security credential, the random identifier and the unique identifier;

relaying the command request from the security controller to the credential controller for processing of the security credential;

receiving a command message at the security controller, the command message issued from the credential controller in response to the credential controller performing a verification process to determine the command request to be one of approved and unapproved, wherein the command request is determined as approved in response to the random identifier and the unique identifier included therewith properly matching with the random identifier and the unique identifier associated with the security message;

controlling the charging security system to remain in the armed state in response to the command message indicating the command request to be unapproved;

controlling the charging security system from the armed state to the disarmed state in response to the command message indicating the command request to be approved;

in the armed state, generating an alert response to the vehicle being disconnected from the charging station or a locking configured to thwart disconnecting a charging cord of the charging station from the vehicle; and in the disarmed state, preventing the alert from being generated in response to the vehicle being electrically disconnected from the charging station or unlocking the lock to permit disconnecting the charging cord from the vehicle.

14. A system for controlling a charging security system, the charging security system configured to secure a charging event between a charging station and a vehicle, comprising:

a credential controller offboard the vehicle configured to provide a security message to a mobile device operating offboard the vehicle in response to receiving a security request therefrom, the security message including a security credential generated by the credential controller uniquely for the mobile device; and a security controller onboard the vehicle configured to:

exchange a command request with the mobile device via a near field communication reader onboard the vehicle, the command request requesting the security controller to transition the charging security system from an armed state to a disarmed state, the command request including the security credential;

relay the command request to the credential controller for processing of the security credential;

exchange a command message with the credential controller in response to the credential controller performing a verification process on the security credential included within the command request, the verification process determining the command request to be one of approved and unapproved;

control the charging security system to remain in the armed state in response to the command message indicating the command request to be unapproved; and control the charging security system from the armed state to the disarmed state in response to the command message indicating the command request to be approved:

wherein the charging security system includes an alarm, the armed state arming the alarm to generate an alert in response to the charging station being electrically disconnected from the vehicle, the disarmed state disarming the alarm to prevent the alert from being generated in response to the charging station being electrically disconnected from the vehicle.

15. The system according to claim 14, wherein:

the charging security system is onboard the charging station.

16. The system according to claim 14, wherein:

the charging security system is onboard the vehicle.

* * * * *